US008958635B2

(12) United States Patent
Lebowsky (10) Patent No.: US 8,958,635 B2
(45) Date of Patent: Feb. 17, 2015

(54) METHOD AND DEVICE FOR PROCESSING A DIGITAL IMAGE

(75) Inventor: Fritz Lebowsky, Saint Martin D'Uriage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 599 days.

(21) Appl. No.: 13/105,086

(22) Filed: May 11, 2011

(65) Prior Publication Data

US 2011/0305390 A1    Dec. 15, 2011

(30) Foreign Application Priority Data

Jun. 9, 2010    (FR) ...................................... 10 54543

(51) Int. Cl.
*G06K 9/00*    (2006.01)
*H04N 1/407*    (2006.01)
*H04N 1/60*    (2006.01)

(52) U.S. Cl.
CPC ............ *H04N 1/407* (2013.01); *H04N 1/6011* (2013.01)
USPC ........... 382/167; 382/168; 382/162; 382/169; 358/1.9

(58) Field of Classification Search
CPC .............................. H04N 1/407; H04N 1/6011
USPC ......... 382/162, 263, 264, 274, 254, 167, 168, 382/196; 345/102, 204, 590, 77, 82, 88, 345/214, 690, 600; 358/1.9, 2.1, 500, 504, 358/468, 1.16, 1.3, 406, 400, 517, 519, 520, 358/521, 522, 523
See application file for complete search history.

(56) References Cited

U.S. PATENT DOCUMENTS

| | | | | |
|---|---|---|---|---|
| 5,850,472 A * | 12/1998 | Alston et al. | .................. | 382/162 |
| 6,522,778 B1 * | 2/2003 | Tamagawa | .................... | 382/167 |
| 7,595,921 B2 * | 9/2009 | Ito et al. | ........................ | 358/519 |
| 7,633,658 B2 * | 12/2009 | Tsuji | ............................. | 358/518 |
| 7,773,252 B2 * | 8/2010 | Yoshida et al. | ................ | 358/1.9 |
| 7,809,188 B1 * | 10/2010 | Zhou | ............................. | 382/168 |
| 8,045,186 B2 * | 10/2011 | Sakurai | ........................ | 358/1.12 |
| 8,514,451 B2 * | 8/2013 | Muto et al. | .................... | 358/2.1 |
| 2003/0012437 A1 * | 1/2003 | Zaklika et al. | ................ | 382/169 |

(Continued)

OTHER PUBLICATIONS

French Search Report mailed Nov. 24, 2010 for FR1054543 (2 pages).

(Continued)

*Primary Examiner* — Mekonen Bekele
(74) *Attorney, Agent, or Firm* — Gardere Wynne Sewell LLP (57) ABSTRACT

A digital image including a plurality of pixels is processed. Each pixel has at least one colorimetric component. The processing of the image includes processing for each pixel of a group of pixels of the image and for each colorimetric component of the pixel. In this processing, a modification is made to the value of the colorimetric component so as to obtain a modified value situated inside or outside a colorimetric range. A comparison is made of the modified value to the upper and lower limits of the associated colorimetric range. If the corrected value is outside the associated colorimetric range, a corrected value equal to an additional value is assigned to the corresponding colorimetric component of the pixel. The additional value is chosen to be unique and included in the associated colorimetric range and different from the values of the limits of the associated colorimetric range.

31 Claims, 4 Drawing Sheets

(56) References Cited

U.S. PATENT DOCUMENTS

2007/0188782 A1* 8/2007 Sakurai .................. 358/1.9
2008/0007784 A1* 1/2008 Tsuji ..................... 358/2.1
2010/0086201 A1* 4/2010 Muto et al. ............. 382/162
2011/0149319 A1* 6/2011 Muto et al. ............. 358/1.9

OTHER PUBLICATIONS

Miller, David: "Preview Channel Clipping," Feb. 27, 2008, XP-002610274, URL: http://blogs.oreilly.com/lightroom/2008/02/preview-channel-clipping.html (2 pages).
"Making Color and Tonal Adjustment," Adobe Photoshop 5.0 User Guide, XP-002529107, pp. 110-111, Jan. 11, 1998 (Jan. 1, 1998).

* cited by examiner

METHOD AND DEVICE FOR PROCESSING A DIGITAL IMAGE

PRIORITY CLAIM

This application claims priority from French Application for Patent No. 1054543 filed Jun. 9, 2010, the disclosure of which is hereby incorporated by reference.

TECHNICAL FIELD

The invention relates to the processing of a digital image and more particularly to the processing of information on luminosity, contrast and color of a digital image.

BACKGROUND

Currently, certain applications provide a user with the possibility of modifying the information of a given digital image. These applications usually provide cursors allowing the user to modify this information, such as, for example, cursors for modifying the contrast, the luminosity or the colors of the image.

The information of an image is stored in the pixels of the image. Usually the pixels of an image comprise three colorimetric components which define a colorimetric space which contains the luminosity, contrast and color information. The image format most widely used is the "RGB" (red, green, blue) format in which each pixel of the image comprises three components, red, green, blue, which make it possible to represent a colorimetric space that can be seen by the human eye.

When digital images encoded on 8 bits are used, each colorimetric component has a value included in a colorimetric range [0; 255]. When the image is encoded on 16 bits, this colorimetric range is equal to [0; 65535], etc.

There are other digital-image formats. The "YUV" format or "luminance, blue chrominance and red chrominance", the "Lab" format or "brightness, range of the red-green axis and range of the yellow-blue axis", the "HSB" or "hue, saturation and brightness" format etc.

All these formats have in common the fact that they define each pixel of the digital image with the aid of three components, for example by the triplet (I1, I2, I3), which define a colorimetric space.

In addition, the colorimetric components belong to colorimetric ranges which differ depending on the image formats.

For example, the "Lab" format uses an identical colorimetric range [0; 100] for each colorimetric component. But the "HSB" format uses a colorimetric range [0; 1] for the Saturation and Brightness components and a second different colorimetric range [0; 360] for the Hue component.

Therefore, when the user wishes to modify the information of the image, for example by choosing to increase the contrast of the image that he views for example on a screen, he will increase the values of the colorimetric components of each pixel of the image. The application of image processing can therefore modify the value of a colorimetric component so that the modified value is outside the colorimetric range associated with the component. It is then said that there is a violation of the colorimetric space because this modified value cannot be taken into account. These applications are therefore provided with a step which converts the modified value to a default value.

Figure 1:
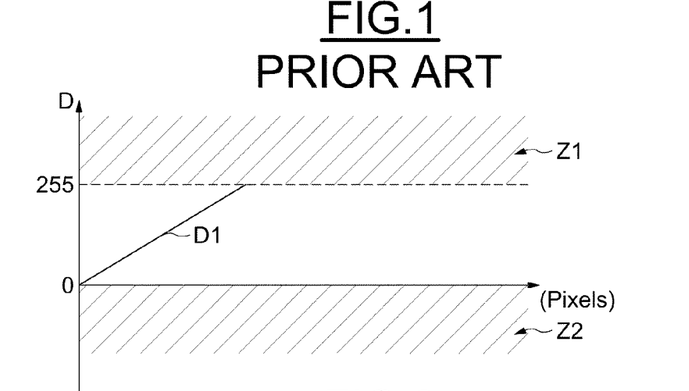
FIGS. 1 to 4, already described, illustrate a method for processing a digital image according to the prior art.

FIG. 1 illustrates schematically an example of conversion that is usually used to prevent a violation of the colorimetric space of a given digital image.

Shown in FIG. 1 is an example of a distribution D1 of the pixels of the image as a function of the values D of a colorimetric component of the pixels. On the X-axis, the positions of the pixels in the image are shown. In this example, the colorimetric range corresponding to the colorimetric component is equal to [0; 255]. Also shown in cross-hatching is a first zone Z1 in which the value of the colorimetric component is strictly above 255 and a second zone Z2 in which the value of the colorimetric component is strictly below 0. These two zones Z1, Z2 correspond to a violation of the colorimetric space.

Figure 2:
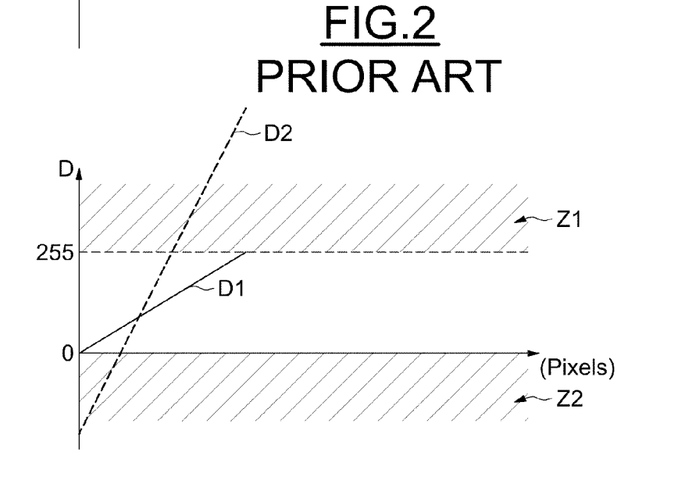

FIG. 2 shows as a dashed line the effect of an increase in the contrast of the image. This modification causes a new distribution D2 of the pixels of the image as a function of the values D of the colorimetric component and certain modified values may be in the violation zones Z1, Z2.

Figure 3:
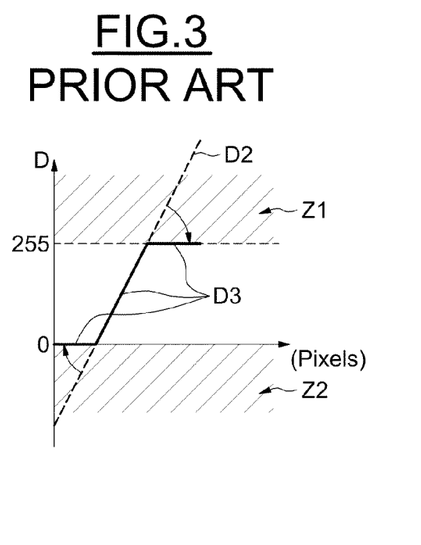

FIG. 3 shows a first example of conversion for preventing the modified values being outside the colorimetric range. In this example, the modified values which are in the first zone Z1 take the default value 255, that is to say that they take the value of the upper limit of the colorimetric range. Moreover, the modified values that are in the second zone Z2 take the default value 0, that is to say that they take the value of the lower limit of the colorimetric range. The modified values that are in the colorimetric range [0; 255] retain their values. This then gives a new distribution D3 of the pixels of the image as a function of the values D of the colorimetric component shown in thick dashes in FIG. 3.

Figure 4:
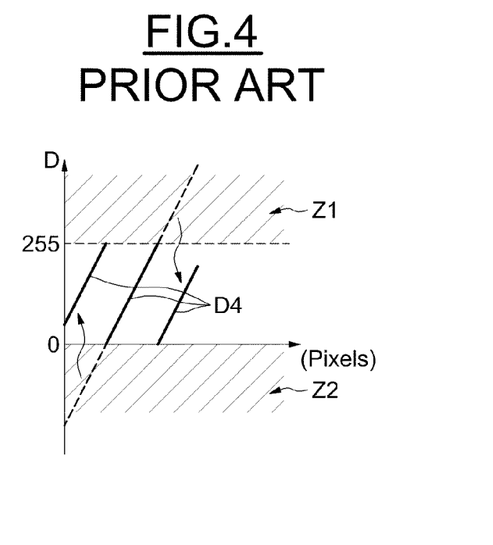

FIG. 4 shows another example of conversion in which the modified values are transferred from the lower limit of the colorimetric range, when the modified values are strictly above 255, and are based on the upper limit of the colorimetric range when the modified values are strictly below 0. This then gives another distribution D4 of the pixels of the image as a function of the values D of the colorimetric component, shown in thick dashes in FIG. 4.

But although these methods make it possible to control the violations of the colorimetric space of an image, they do not allow the user to see whether the modification that he required is permitted or not. This means that the user has no way of knowing whether the modified values are outside the colorimetric ranges corresponding to the colorimetric components of the pixels.

Specifically, the current image processing techniques automatically control any violation of the colorimetric space without informing the user that a violation of the colorimetric space has occurred.

Moreover, the assignment of the modified values situated outside the colorimetric ranges to default values does not allow the user to correctly view these violations because the image thus converted is, for the human eye, close to the original image.

In other words, the violation information is submerged in the image.

SUMMARY

According to one application and embodiment, a method and a device are therefore proposed for processing images which provide the user with the possibility of viewing the violations of the colorimetric space of an image after the latter has been modified.

According to one aspect, a method is proposed for processing a digital image, the digital image comprising a plurality of pixels each having at least one colorimetric component; this method comprises: for each pixel of a group of pixels of the image and for each colorimetric component of the pixel: a modification of the value of the corresponding colorimetric component so as to obtain a modified value situated inside or outside a colorimetric range associated with the corresponding colorimetric component; a correction step comprising a comparison of the modified value with the upper and lower limits of the associated colorimetric range, an assignment to the corresponding colorimetric component of the pixel of a corrected value equal to the modified value if the modified value is included in the associated colorimetric range, or equal to an additional value otherwise, the additional value being chosen from a set associated with the corresponding colorimetric component and which contains at least one unique reference value included in the associated colorimetric range and different from the limit values of the associated colorimetric range; and a representation of the pixels of the group based on their colorimetric component(s) assigned with the corrected values.

Therefore, by assigning, to the modified values of the image that are situated outside the colorimetric space, a unique reference value that is situated in the colorimetric range and that is different from the limits, a user can view the violations of the colorimetric space.

In this method, each set associated with a colorimetric component may contain a first unique reference value included between the lower limit of the associated colorimetric range and a top threshold strictly below the upper limit of the associated colorimetric range and a second unique reference value included between a bottom threshold that is strictly above the lower limit of the associated colorimetric range and the upper limit of the associated colorimetric range, and the assignment step comprises an assignment to the corresponding colorimetric component of the pixel of a corrected value equal to the first unique reference value if the modified value is strictly above the upper limit of the associated colorimetric range or equal to the second unique reference value if the modified value is strictly below the lower limit of the associated colorimetric range.

Therefore, it is possible to choose as a reference value a value included in the colorimetric range and in a zone opposite to the limit that has been crossed by the modified value. This then assigns to any modified value that is, for example, in the first violation zone Z1, a unique reference value included between [0; 128]. Moreover, any modified value that is in the second violation zone Z2 is assigned a second unique reference value included between [128; 255].

In other words, any modified value having crossed a limit of the colorimetric range is in this instance assigned a unique reference value that is distant from the limit that has been crossed. This improves the viewing of the violations by the user.

Each pixel of the image may also have three colorimetric components respectively associated with three colorimetric ranges.

Each pixel of the image may also have three colorimetric components associated with at least three colorimetric ranges.

Advantageously, the top threshold of each colorimetric range is below a value centered on the colorimetric range.

The bottom threshold of each colorimetric range may also be above a value centered on the colorimetric range.

According to one method of application, when there are several colorimetric ranges, the first unique reference values are equal to one another or distinct in pairs.

The second unique reference values may also be equal to one another or distinct in pairs.

According to one method of application, each pixel of the digital image has three colorimetric components respectively associated with three colorimetric ranges; this method comprises: for each pixel of a group of pixels of the image and for each colorimetric component of the pixel: a modification of the value of the corresponding colorimetric component so as to obtain a modified value situated inside or outside the colorimetric range associated with the corresponding colorimetric component; a correction step comprising a comparison of the modified value with the upper and lower limits of the associated colorimetric range, an assignment to the corresponding colorimetric component of the pixel of a corrected value equal to the modified value if the modified value is included in the associated colorimetric range, or equal to a first unique reference value included between the lower limit of the associated colorimetric range and a top threshold strictly below the upper limit of the associated colorimetric range if the modified value is strictly above the upper limit of the associated colorimetric range, or equal to a second unique reference value included between a bottom threshold that is strictly above the lower limit of the associated colorimetric range and the upper limit of the associated colorimetric range if the modified value is strictly below the lower limit of the associated colorimetric range, the first unique reference values and the second unique reference values being different from the limit values of the associated colorimetric range; and a representation of the pixels of the group based on their colorimetric component(s) assigned with the corrected values, the first unique reference values being equal to one another and the second unique reference values being equal to one another.

According to yet another method of application, the modification step comprises a modification of the first and second unique reference value(s).

Therefore, it is possible to leave the user the choice of adjusting the reference value that will be allocated to the components of the pixels situated outside the colorimetric range corresponding to the colorimetric component.

Moreover, the representation step may comprise a display on a screen and/or a printout with the aid of a printer.

According to another aspect, a device for processing a digital image is proposed, the digital image comprising a plurality of pixels each having at least one colorimetric component, the device comprising representation means configured to represent the pixels of the digital image based on their colorimetric component(s) assigned with a value included in a colorimetric range associated with the corresponding colorimetric component.

This device comprises modification means configured to modify the value of each colorimetric component of each pixel of a group of pixels of the image so as to obtain a modified value situated inside or outside the colorimetric range associated with the corresponding colorimetric component, correction means configured to correct the modified value of each colorimetric component of each pixel of the group, the correction means comprising comparison means configured to compare the modified values with the upper and lower limits of the associated colorimetric range and assignment means configured to assign to the corresponding colorimetric component of the pixel a corrected value equal to the modified value if the modified value is included in the associated colorimetric range, or equal to an additional value otherwise, the additional value being chosen from a set associated with the corresponding colorimetric component and which contains at least one unique reference value included in the associated colorimetric range and different from the values of the limits of the associated colorimetric range, the representation means also being configured to represent the pixels of the group with their colorimetric component(s) assigned with the corrected values.

Each set associated with a colorimetric component may contain a first unique reference value included between the lower limit of the associated colorimetric range and a top threshold that is strictly below the upper limit of the associated colorimetric range and a second unique reference value included between a bottom threshold that is strictly above the lower limit of the associated colorimetric range and the upper limit of the associated colorimetric range, and the assignment means are also configured to assign to the corresponding colorimetric component of the pixel a corrected value equal to the first unique reference value if the modified value is strictly above the upper limit of the associated colorimetric range or equal to the second unique reference value if the modified value is strictly below the lower limit of the associated colorimetric range.

Each pixel of the image may also have three colorimetric components respectively associated with three colorimetric ranges.

Each pixel of the image may also have three colorimetric components associated with at least three colorimetric ranges.

Advantageously, the top threshold of each colorimetric range is below a value centered on the colorimetric range.

The bottom threshold of each colorimetric range may be above a value centered on the colorimetric range.

According to one embodiment, the first unique reference values are equal to one another or distinct in pairs.

The second unique reference values may also be equal to one another or distinct in pairs.

According to one embodiment, each pixel of the digital image has three colorimetric components respectively associated with three colorimetric ranges, the device comprising representation means configured to represent the pixels of the digital image based on their colorimetric component(s) assigned with a value included in the colorimetric range associated with the corresponding colorimetric component.

This device comprises modification means configured to modify the value of each colorimetric component of each pixel of a group of pixels of the image so as to obtain a modified value situated inside or outside the colorimetric range associated with the corresponding colorimetric component, correction means configured to correct the modified value of each colorimetric component of each pixel of the group, the correction means comprising comparison means configured to compare the modified values with the upper and lower limits of the associated colorimetric range and assignment means configured to assign to the corresponding colorimetric component of the pixel a corrected value equal to the modified value if the modified value is included in the associated colorimetric range, or equal to a first unique reference value included between the lower limit of the associated colorimetric range and a top threshold strictly below the upper limit of the associated colorimetric range if the modified value is strictly above the upper limit of the associated colorimetric range, or equal to a second unique reference value included between a bottom threshold that is strictly above the lower limit of the associated colorimetric range and the upper limit of the associated colorimetric range if the modified value is strictly below the lower limit of the associated colorimetric range, the first unique reference values and the second unique reference values being different from the limit values of the associated colorimetric range, the representation means also being configured to represent the pixels of the group with their colorimetric component(s) assigned with the corrected values, the first unique reference values being equal to one another and the second unique reference values being equal to one another.

According to another embodiment, the modification means are also configured to modify the first and second unique reference value(s).

The representation means may comprise a screen, for example a liquid crystal display screen, and/or a printer.

BRIEF DESCRIPTION OF THE DRAWINGS

Other advantages and features will appear on examination of the detailed description of embodiments and applications of the invention, that are in no way limiting, and of the appended drawings in which.

DETAILED DESCRIPTION OF THE DRAWINGS

Figure 5:
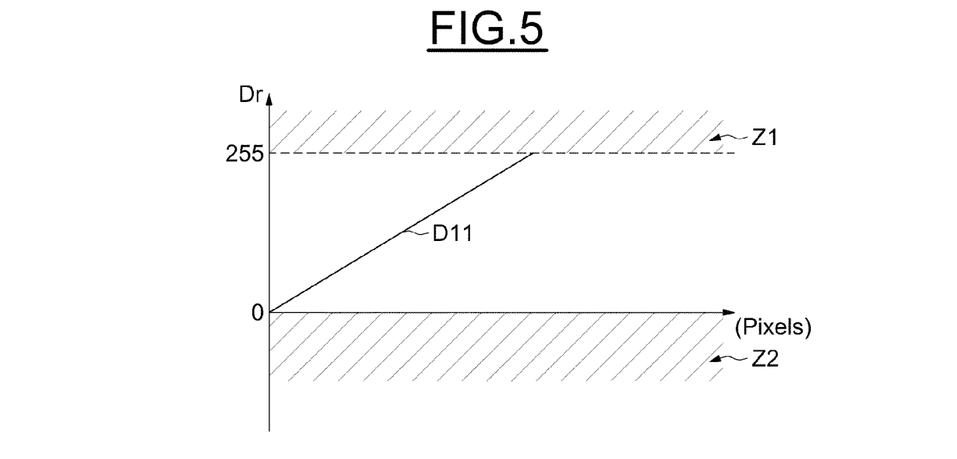
FIGS. 5 to 7 illustrate schematically one mode of applying a method for processing a digital image according to the invention.
Figure 6:
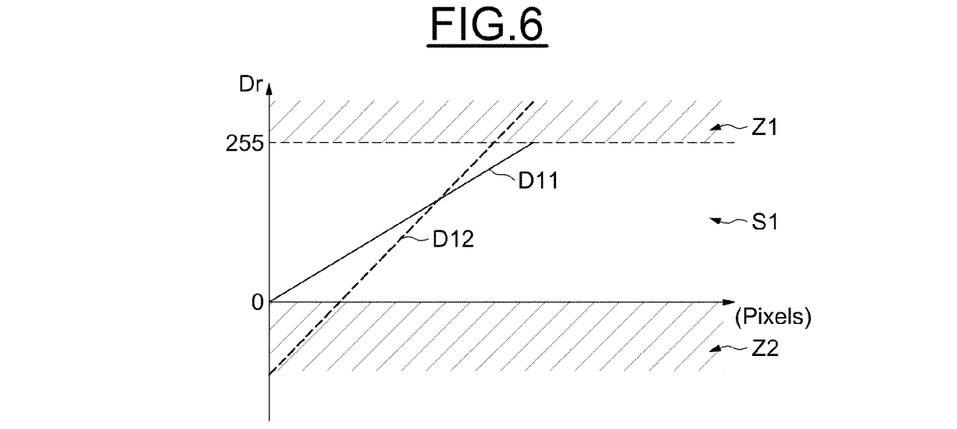
Figure 7:
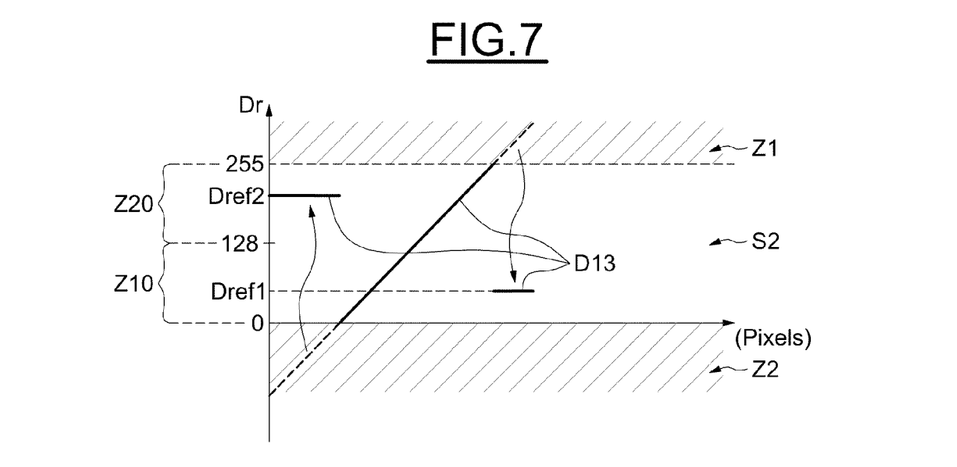

FIGS. 5 to 7 show schematically a mode of applying a method for processing a digital image according to the invention.

FIG. 5 illustrates schematically an example of a distribution D11 of the pixels of a given digital image as a function of the values Dr of a "red" colorimetric component of the pixels. Also shown on the X-axis are the positions of the pixels in the given digital image. In this example, the given digital image is in an "RGB" format and is encoded on 8 bits. This given image comprises several pixels, each pixel comprises three "RGB" colorimetric components. FIGS. 5 to 7 show a single colorimetric component, the "red" component for example. This colorimetric component may take several values Dr included in a colorimetric range corresponding to the component. This colorimetric range is equal to [0; 255] because the image is encoded on 8 bits. Also shown in cross-hatching is the first zone Z1 in which the value of the colorimetric component is strictly above 255 and the second zone Z2 in which the value of the colorimetric component is strictly below 0. These two zones Z1, Z2 correspond to a violation of the colorimetric range and therefore to a violation of the colorimetric space of the image.

Each pixel of the image may also have three colorimetric components associated with at least three colorimetric ranges, for example six colorimetric ranges (or color spaces). Indeed, the colorimetric space of the image can be divided into several color spaces, for examples six color zones respectively equal to six tetrahedrons. Thus, the three RGB colorimetric components can be associated with these six tetrahedrons.

FIG. 6 shows schematically a first step S1 in which the user modifies the values of the colorimetric components of all the pixels of the image or of a set of pixels. For example, this modification may consist in increasing/reducing the contrast of the image, increasing/reducing the luminosity of the image, etc. These modifications cause a modification in the values of the colorimetric components of the pixels of the image. This gives a new distribution D12 of the pixels of the given digital image as a function of the values Dr of the "red"

colorimetric component of the pixels. That is to say a new distribution D12 of the pixels of the image having modified values of their "red" colorimetric component.

After the first step S1, a correction step S2 is carried out, shown in FIG. 7, comprising a comparison step and an assignment step. The correction step S2 makes it possible, during the comparison step, to detect the modified values that are outside the colorimetric ranges for each colorimetric component of the pixels, and then makes it possible to assign to each colorimetric component the modified values of which are outside the corresponding colorimetric range an additional value chosen from a set of at least one reference value, and preferably two reference values. This then gives, after the correction step S2, another distribution D13 of the pixels of the given digital image as a function of the values Dr of the "red" colorimetric component of the pixels, shown in thick lines in FIG. 7.

This other distribution D13 comprises a central portion for which the modified values assigned to the colorimetric component of the associated pixel remain included in the colorimetric range. For the modified values that are strictly above 255, the corresponding colorimetric component of the pixel is assigned a first unique reference value Dref1. This first unique reference value Dref1 is included in the colorimetric range corresponding to the colorimetric component. Preferably, this first value Dref1 is included in a first zone Z10 opposite to the upper limit of the colorimetric range. In other words, this zone Z10 is situated in the corresponding colorimetric range and is at a distance from the upper limit. For example, this first opposite zone Z10 may comprise the range [0; 128] in which 128 corresponds to the value centered on the colorimetric range [0; 255], that is to say the mean value of the range. Therefore, the first reference value Dref1 is unique; it is included in the first opposite zone Z10 which comprises values that are different from the values that are close to the upper limit of the colorimetric range. It will be noted that, for example, considered in this instance to be close to the upper limit of the colorimetric range are values included between [128; 255]. Choosing this first reference value Dref1 in this first opposite zone Z10 makes it possible to correctly distinguish it from the values close to the upper limit of the colorimetric range.

In the same manner, for the modified values that are strictly below 0, a second unique reference value Dref2 is assigned to the corresponding colorimetric component of the pixel. This second unique reference value Dref2 is included in the colorimetric range corresponding to the colorimetric component. Preferably, this second value Dref2 is included in a second zone Z20 opposite to the lower limit of the colorimetric range. Here again, this zone Z20 is situated in the colorimetric range and is at a distance from the lower limit. For example, this second opposite zone Z20 may comprise the range [128; 255]. Therefore, the second reference value Dref2 is unique; it is included in the second opposite zone Z20 that comprises values that are different from the values that are close to the lower limit of the colorimetric range. It will be noted that, for example, considered in this instance to be close to the lower limit of the colorimetric range are values included between [0; 128]. Choosing this second reference value Dref2 in this second opposite zone Z20 makes it possible to correctly distinguish amongst the values close to the lower limit of the colorimetric range.

Figure 8:
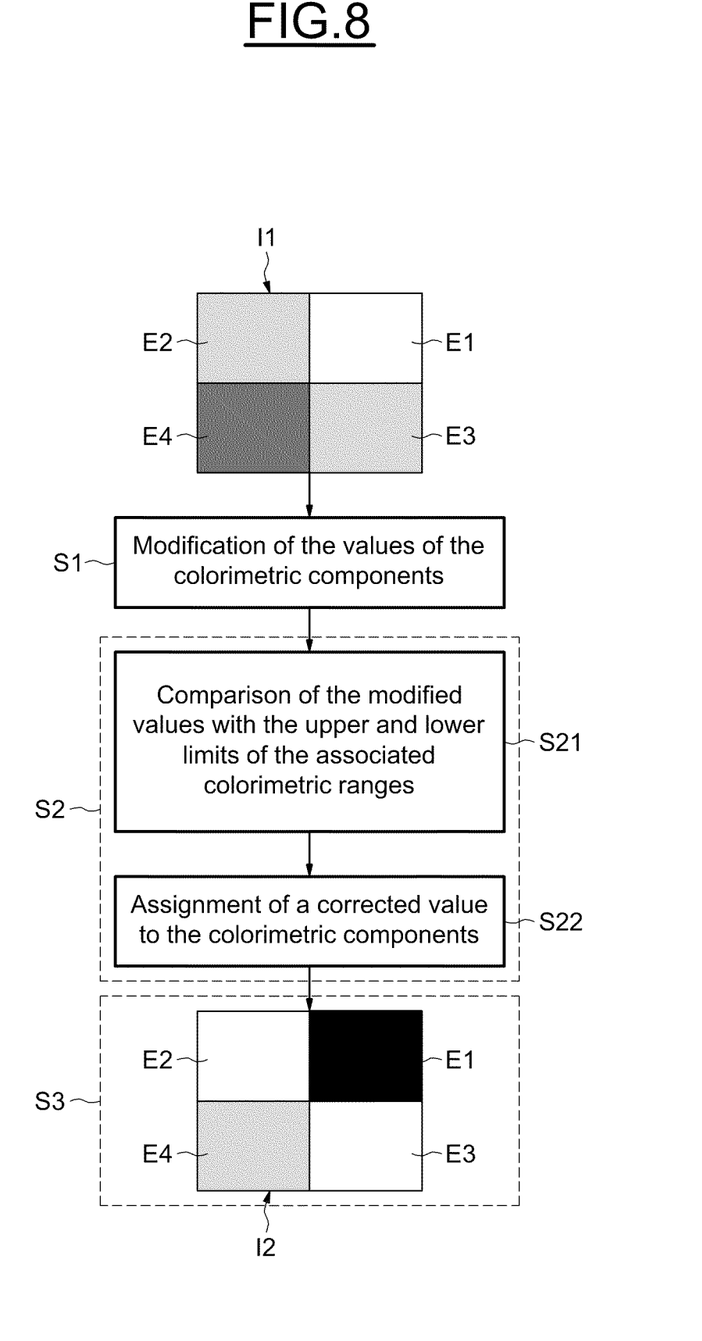
FIG. 8 illustrates schematically the main steps of one mode of applying a method for processing a digital image.

FIG. 8 shows schematically and as an example the main steps of the method for processing a given digital image I1. This digital image I1 comprises four sets of pixels E1, E2, E3, E4. The first set E1 of pixels comprises pixels having their three components equal to 255, the second and third sets E2, E3 of pixels comprise pixels having their three components equal to 200 and the fourth set E4 of pixels comprises pixels having their three components equal to 125. Based on this given digital image I1, the first modification step S1 and the second correction step S2 comprising the comparison step S21 and assignment step S22, as described in relation to FIGS. 6 and 7 above, are carried out.

During the first modification step S1, the luminosity of the pixels is increased, for example. In this case, the fourth set E4 of pixels comprises pixels having their three modified components equal to 200, the second and third sets E2, E3 of pixels comprise pixels having their three modified components equal to 255 and the first set E1 of pixels comprises pixels having their three modified components strictly above 255, and cannot be represented, because they are situated outside the colorimetric range [0; 255].

Corrected values respectively equal to three unique reference values respectively associated with the three colorimetric components, for example equal to the triplet (10; 10; 10) are then assigned to the components of the pixels of the first set E1 of pixels.

The corrected values of the pixels of the sets E2-E4 remain equal to the modified values because these modified values stay in the range [0; 255].

Moreover, the method comprises a step S3 for representing the pixels, in which step the corrected values of the pixels of the image are represented. For example, it is possible to display a new image I2 that is established on the basis of the corrected values, for example with the aid of a screen, or it is possible to print out this new image I2 with the aid of a printer.

Therefore, it will be noted that the pixels E1 of the new image I2 that have had a value that violated the colorimetric space of the given image I1 appear distinctly relative to the pixels E2-E3 that are close to the upper limit 255 of the colorimetric range.

This display of the modified values therefore allows the user to correctly view the pixels that have been modified so that their new value is outside the colorimetric space.

Figure 9:
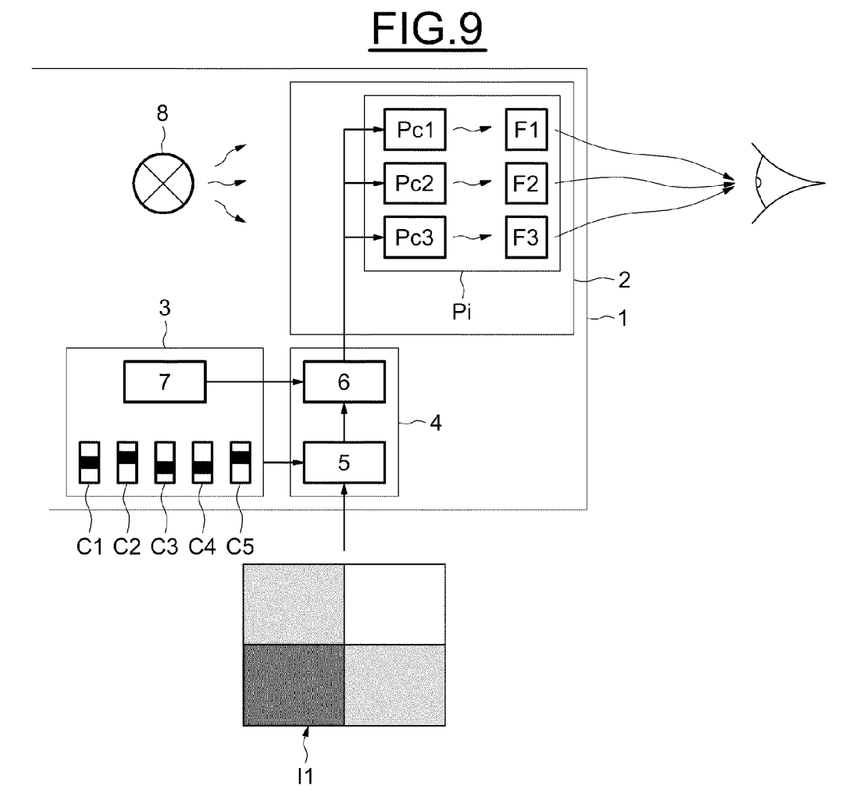
FIG. 9 illustrates schematically an embodiment of a device for processing a digital image according to the invention.

FIG. 9 shows schematically a device 1 for processing the given digital image I1 that is notably capable of applying the method described in the preceding figures.

The processing device 1 comprises representation means 2 configured to represent the values of the components of the pixels of digital images.

The processing device 1 also comprises modification means 3 configured to modify the value of each colorimetric component of the pixels of the given image I1. For example, these modification means 3 comprise five cursors C1 to C5 in order respectively to modify the luminosity, the contrast, the red, the blue and the green of the given image I1.

Moreover, the processing device 1 comprises correction means 4 configured to correct the modified value of each colorimetric component of each pixel, or of a group of chosen pixels, of the given digital image I1. In addition, the correction means 4 comprise comparison means 5 for comparing the modified values with the lower and upper limits of the colorimetric ranges and assignment means 6 configured to assign a corrected value, for each colorimetric component of each pixel, or group of pixels of the given digital image, to the colorimetric component, the corrected value being equal to the modified value of the corresponding pixel if the modified value is included in the colorimetric range associated with the colorimetric component, or equal to an additional value otherwise. The additional value corresponds either to the first unique reference value Dref1, if the modified value is strictly above the upper limit of the colorimetric range, or to the second unique reference value Dref2, if the modified value is strictly below the lower limit of the colorimetric range.

Moreover, the modification means 3 may comprise means 7 for adjusting the values of the first and second unique reference values, such as for example a cursor or a means for entering a value.

All these means can be produced by software, or equally in the form of logic circuits and can be installed in a computer or in a microprocessor.

In FIG. 9, the representation means 2 are represented by a screen of the "LCD" or "Liquid Crystal Display" type. This screen 2 comprises a plurality of display pixels Pi configured to display respectively the corrected values of the pixels of the given digital image I1. Each display pixel Pi is coupled to the assignment means 6 of the correction means 4.

For example, each display pixel also comprises one or more means Pc1 to Pc3 for modulating the light, these means being associated respectively with the corresponding colorimetric components, each means Pc1 to Pc3 for modulating the light being configured to display the corrected value of the corresponding colorimetric component. Moreover, the screen 2 also comprises lighting means 8 for lighting the display pixels Pi, and each display pixel Pi comprises filters F1 to F3 respectively associated with the means Pc1 to Pc3 for modulating the light. For example, these filters F1 to F3 are respectively red, green and blue filters.

Figure 10:
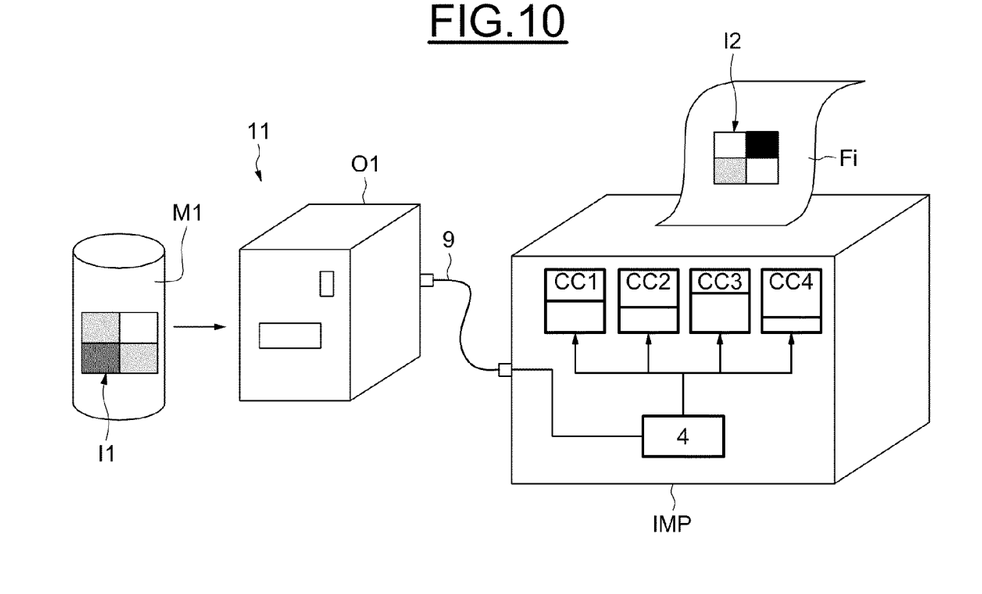
FIG. 10 illustrates schematically another embodiment of a device for processing a digital image.

FIG. 10 shows another embodiment of a device 1 for processing a digital image.

In this other embodiment, the given digital image I1 is stored in a dedicated memory space M1 of a computer O1. This computer O1 is coupled to a printer IMP via a connection 9. The computer O1 can transfer a copy of the given image I1, or the image itself, to the printer IMP.

The printer IMP comprises printing means CC1 to CC4 for printing respectively the "yellow", "magenta", "cyan" and "black" colors to a printout sheet Fi. The printer IMP also comprises the correction means 4 described in relation to the previous figure. These correction means 4 are coupled to the connection 9 so as to be able to receive the copy of the image I1, or the given image itself, and to the printing means CC1 to CC4 so as to control the printing of the image I2 after correction.

In this embodiment, the device 1 also comprises the modification means 3, described in relation to FIG. 9 above. The latter can be incorporated into the computer O1, but also into the printer so as to be able to modify the images locally before printing.

The method and the device thus proposed make it possible to display and/or print pixels of an image that have undergone a modification such that the new value to be assigned is outside a range, that is to say in violation of the colorimetric space of the image.

The method and the device also allow the user to view these violations by selecting a reference value so that it can be seen amongst the surrounding pixels, without being submerged amongst the latter.

What is claimed is:

1. A method for processing a digital image comprising a plurality of pixels each having at least one colorimetric component, the method comprising for each pixel of a group of pixels of the image and for each colorimetric component of the pixel:

modifying the value of the corresponding colorimetric component so as to obtain a modified value situated inside or outside a colorimetric range associated with the corresponding colorimetric component;

performing a correction by:

comparing the modified value with the upper and lower limits of the associated colorimetric range, assigning to the corresponding colorimetric component of the pixel a corrected value equal to the modified value if the modified value is included in the associated colorimetric range, or assigning to the corresponding colorimetric component of the pixel a corrected value equal to an additional value if the modified value is not included in the associated colorimetric range, wherein the additional value is chosen from a set of values associated with the corresponding colorimetric component, and wherein the additional value comprises at least one unique reference value included in the associated colorimetric range and different from the limit values of the associated colorimetric range; and representing the pixels of the group based on their colorimetric component(s) assigned with the corrected values.

2. The method according to claim 1, wherein each set associated with a colorimetric component contains a first unique reference value included between the lower limit of the associated colorimetric range and a top threshold strictly below the upper limit of the associated colorimetric range and a second unique reference value included between a bottom threshold that is strictly above the lower limit of the associated colorimetric range and the upper limit of the associated colorimetric range, and wherein assigning comprises assigning to the corresponding colorimetric component of the pixel a corrected value equal to the first unique reference value if the modified value is strictly above the upper limit of the associated colorimetric range, or wherein assigning comprises assigning to the corresponding colorimetric component of the pixel a corrected value equal to the second unique reference value if the modified value is strictly below the lower limit of the associated colorimetric range.

3. The method according to claim 1, wherein each pixel of the image has three colorimetric components respectively associated with three colorimetric ranges.

4. The method according to claim 1, wherein each pixel of the image has three colorimetric components associated with at least three colorimetric ranges.

5. The method according to claim 3, wherein the top threshold of each colorimetric range is below a value centered on the colorimetric range.

6. The method according to claim 3, wherein the bottom threshold of each colorimetric range is above a value centered on the colorimetric range.

7. The method according to claim 3, wherein the first unique reference values are one of: equal to one another or distinct in pairs.

8. The method according to claim 3, wherein the second unique reference values are one of: equal to one another or distinct in pairs.

9. The method according to claim 2, wherein modifying comprises modifying the first and second unique reference value(s).

10. The method according to claim 1, wherein representing comprises displaying on a screen and/or a printout with the aid of a printer.

11. A device for processing a digital image comprising a plurality of pixels each having at least one colorimetric component, the device comprising:

a representation device configured to represent the pixels of the digital image based on their colorimetric component(s) assigned with a value included in a colorimetric range associated with the corresponding colorimetric component;

a modification device configured to modify the value of each colorimetric component of each pixel of a group of pixels of the image so as to obtain a modified value situated inside or outside the colorimetric range associated with the corresponding colorimetric component;

a correction device configured to correct the modified value of each colorimetric component of each pixel of the group, the correction device comprising:
- a comparing device configured to compare the modified values with the upper and lower limits of the associated colorimetric range; and
- an assignment device configured to assign to the corresponding colorimetric component of the pixel a corrected value equal to the modified value if the modified value is included in the associated colorimetric range, or assign to the corresponding colorimetric component of the pixel a corrected value equal to an additional value if the modified value is not included in the associated colorimetric range, wherein the additional value is chosen from a set of values associated with the corresponding colorimetric component, and wherein the additional value comprises at least one unique reference value included in the associated colorimetric range and different from the values of the limits of the associated colorimetric range, wherein the representation device is configured to represent the pixels of the group with their colorimetric component(s) assigned with the corrected values.

12. The device according to claim 11, wherein each set associated with a colorimetric component contains a first unique reference value included between the lower limit of the associated colorimetric range and a top threshold that is strictly below the upper limit of the associated colorimetric range, and further contains a second unique reference value included between a bottom threshold that is strictly above the lower limit of the associated colorimetric range and the upper limit of the associated colorimetric range, and
wherein the assignment device is also configured to assign to the corresponding colorimetric component of the pixel a corrected value equal to the first unique reference value if the modified value is strictly above the upper limit of the associated colorimetric range or assign to the corresponding colorimetric component of the pixel a corrected value equal to the second unique reference value if the modified value is strictly below the lower limit of the associated colorimetric range.

13. The device according to claim 11, wherein each pixel of the image has three colorimetric components respectively associated with three colorimetric ranges.

14. The device according to claim 11, wherein each pixel of the image has three colorimetric components associated with at least three colorimetric ranges.

15. The device according to claim 13, wherein the top threshold of each colorimetric range is below a value centered on the colorimetric range.

16. The device according to claim 13, wherein the bottom threshold of each colorimetric range is above a value centered on the colorimetric range.

17. The device according to claim 13, wherein the first unique reference values are one of: equal to one another or distinct in pairs.

18. The device according to claim 13, wherein the second unique reference values are one of: equal to one another or distinct in pairs.

19. The device according to claim 12, wherein the modification device is also configured to modify the first and second unique reference value(s).

20. The device according to claim 11, wherein the representation device comprise a screen and/or a printer.

21. The device according to claim 11, wherein the representation device comprises a liquid crystal display screen.

22. A method, comprising:
receiving a digital image comprising a plurality of pixels each having at least one colorimetric component having a value situated within a permitted colorimetric value range;

modifying the value of a corresponding colorimetric component so as to obtain a modified value, wherein the plurality of pixels after modifying include first pixels with modified values situated within the permitted colorimetric value range, second pixels with modified values situated below the permitted colorimetric value range and third pixels with modified values situated above the permitted colorimetric value range;

assigning to the corresponding colorimetric component of each of the second pixels a first corrected value different from the modified value situated below the permitted colorimetric value range;

wherein the assigned first corrected value is chosen from a set of unique reference values associated with the permitted colorimetric value range, and wherein the assigned first corrected value comprises a same unique first reference value included within the permitted colorimetric value range assigned to all of the second pixels that is different from either an upper or lower limit values of the permitted colorimetric value range.

23. The method of claim 22, further comprising displaying the digital image using the corrected value.

24. The method of claim 22, further comprising:
assigning to the corresponding colorimetric component of each of the third pixels a second corrected value different from the modified value situated above the permitted colorimetric value range;

wherein the assigned second corrected value is chosen from the set of unique reference values associated with the permitted colorimetric value range, and wherein the assigned second corrected value comprises a same second unique reference value included within the permitted colorimetric value range assigned to all of the third pixels that is different from either the upper or lower limit values of the permitted colorimetric value range.

25. Apparatus, comprising:
a first device configured to receive a digital image comprising a plurality of pixels each having at least one colorimetric component having a value situated within a permitted colorimetric value range;

a second device configured to modify the value of a corresponding colorimetric component so as to obtain a modified value, wherein the plurality of pixels after modifying include first pixels with modified values situated within the permitted colorimetric value range, second pixels with modified values situated below the permitted colorimetric value range and third pixels with modified values situated above the permitted colorimetric value range;

a third device configured to assign to the corresponding colorimetric component of each of the second pixels a first corrected value different from the modified value situated below the permitted colorimetric value range;

wherein the assigned first corrected value is chosen from a set of unique reference values associated with the permitted colorimetric value range, and wherein the assigned first corrected value comprises a same first unique reference value included within the permitted colorimetric value range assigned to all of the second pixels that is different from either an upper or lower limit values of the permitted colorimetric value range.

26. The apparatus of claim 25, further comprising a display device configured to display the digital image using the corrected value.

27. The apparatus of claim 25, wherein the third device is further configured to assign to the corresponding colorimetric component of each of the third pixels a second corrected value different from the modified value situated above the permitted colorimetric value range;

wherein the assigned second corrected value is chosen from the set of unique reference values associated with the permitted colorimetric value range, and wherein the assigned second corrected value comprises a same second unique reference value included within the permitted colorimetric value range assigned to all of the third pixels that is different from either the upper or lower limit values of the permitted colorimetric value range.

28. A method, comprising:

receiving a digital image comprising a plurality of pixels each having at least one colorimetric component having a value situated within a permitted colorimetric value range;

modifying the value of a corresponding colorimetric component so as to obtain a modified value, wherein the plurality of pixels after modifying include first pixels with modified values situated within the permitted colorimetric value range, second pixels with modified values situated above the permitted colorimetric value range and third pixels with modified values situated below the permitted colorimetric value range;

assigning to the corresponding colorimetric component of each of the second pixels a corrected value different from the modified value situated above the permitted colorimetric value range;

wherein the assigned corrected value is chosen from a set of unique reference values associated with the permitted colorimetric value range, and wherein the assigned corrected value comprises a same unique reference value included within the permitted colorimetric value range assigned to all of the second pixels that is different from either an upper or lower limit values of the permitted colorimetric value range.

29. The method of claim 28, further comprising displaying the digital image using the corrected value.

30. Apparatus, comprising:

a first device configured to receive a digital image comprising a plurality of pixels each having at least one colorimetric component having a value situated within a permitted colorimetric value range;

a second device configured to modify the value of a corresponding colorimetric component so as to obtain a modified value, wherein the plurality of pixels after modifying include first pixels with modified values situated within the permitted colorimetric value range, second pixels with modified values situated above the permitted colorimetric value range and third pixels with modified values situated below the permitted colorimetric value range;

a third device configured to assign to the corresponding colorimetric component of each of the second pixels a corrected value different from the modified value situated above the permitted colorimetric value range;

wherein the assigned corrected value is chosen from a set of unique reference values associated with the permitted colorimetric value range, and wherein the assigned corrected value comprises a same unique reference value included within the permitted colorimetric value range assigned to all of the second pixels that is different from either an upper or lower limit values of the permitted colorimetric value range.

31. The apparatus of claim 30, further comprising a display device configured to display the digital image using the corrected value.

* * * * *